G. FERGUSON.
SHOE.
APPLICATION FILED SEPT. 29, 1916.
1,286,176.
Patented Nov. 26, 1918
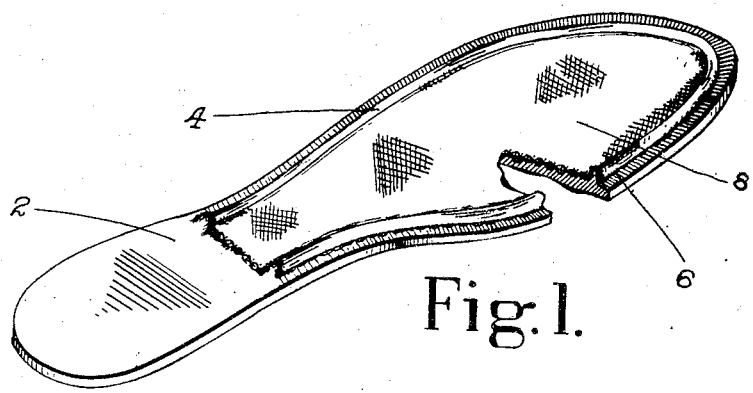
Fig. 1.
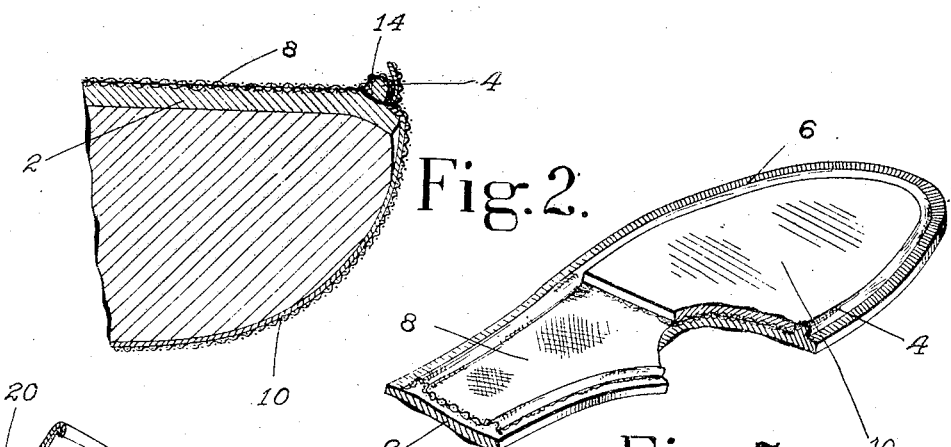
Fig. 2.
Fig. 3.
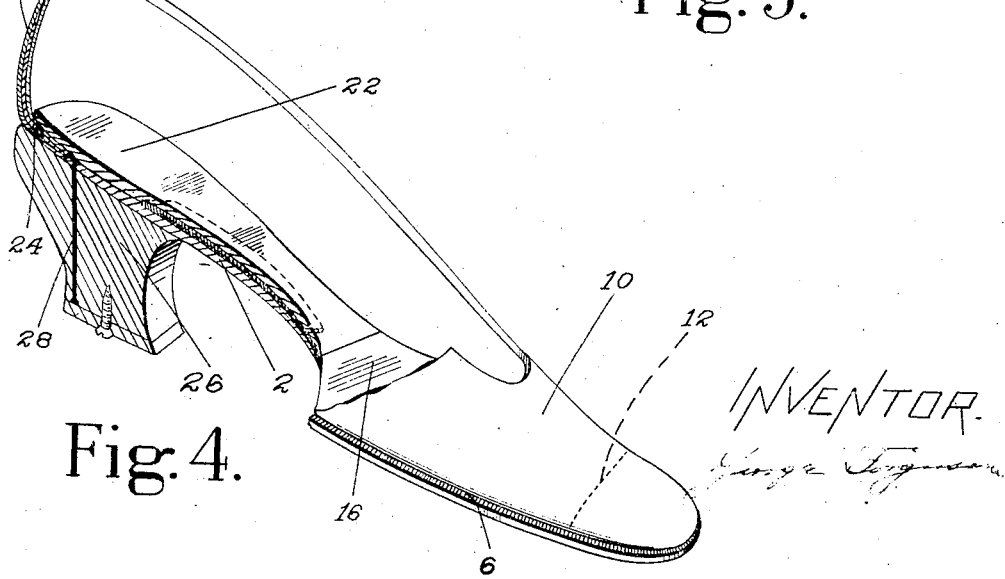
Fig. 4.
INVENTOR.

UNITED STATES PATENT OFFICE.

GEORGE FERGUSON, OF WOLLASTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

SHOE.

1,286,176.     Specification of Letters Patent.     Patented Nov. 26, 1918.

Application filed September 29, 1916. Serial No. 122,874.

*To all whom it may concern:*

Be it known that I, GEORGE FERGUSON, a citizen of the United States, residing at Wollaston, in the county of Norfolk and State of Massachusetts, have invented certain Improvements in Shoes, of which the following description, in connection with the accompanying drawings, is a specification, like reference characters on the drawings indicating like parts in the several figures.

This invention relates to shoes and more particularly to improvements in soles for use in the manufacture of shoes of the type known as "turn" shoes.

The manufacture of rubber sole shoes in which a rubber sole is secured by stitches has, up to the present time, been confined entirely to double sole shoes of the welt and McKay sewed types. Although the advantages of turn shoes are well recognized, it has heretofore been impractical to produce a rubber sole turn shoe, this being due chiefly to the fact that the known rubber soles are not adapted to receive the single faced stitches which are essential to the manufacture of such shoes.

The present invention has for its chief object to provide a novel rubber sole by the use of which a comfortable and serviceable rubber sole shoe may be produced which will possess all of the desirable characteristics of rubber sole shoes in general and, at the same time, include all of the advantageous features of turn shoes.

With this object in view and in accordance with an important feature of the invention, a rubber sole for turn shoes is provided comprising a vulcanized rubber compound body hereinafter generically referred to as rubber, and a piece of fibrous material, a portion of which is formed to receive the stitches uniting a shoe upper to the sole, and the outer margin of which is anchored to the feather of the sole by adhesion, for example vulcanization or cementation, reinforced by a plurality of indentations embedding the said fibrous material into the rubber body. In the illustrated embodiment of the invention the inseam stitch receiving member for the sole comprises a raised rib formed on the upper side of the rubber body and a layer of fabric extending over the raised rib and terminating on the feather at a distance within the outer edge of the sole. The fabric is anchored to the rubber body at the inner side of the rib by vulcanization, and for the purpose of reinforcing the vulcanized union of the fibrous layer to the rubber the margin of the fabric piece is embedded in the rubber along the feather before vulcanization by a plurality of spaced indentations which serve to force the marginal portion of the fabric into the rubber and insure adhesion of the two materials. As thus anchored to the rubber along the feather of the sole, the fibrous material effectively resists the penetrating thrust of the needle during the formation of the inseam stitches by which the shoe upper is secured to the sole. Furthermore, the described attachment of the fibrous layer to the rubber along the feather of the sole, constituting what may be termed a "reinforced vulcanization," enables the shoe upper to be drawn more tightly into the angle between the feather and the sewing rib on the sole without liability of the fibrous layer giving way from the rubber body. Also, such an attachment of the fabric to the feather of the sole serves to stiffen the feather and prevents it from opening away from the upper of the finished shoe. By terminating the fibrous layer on the feather of the sole within the outer edge thereof and embedding the portion of the fibrous layer disposed on the feather in the rubber body, an all-rubber edge face for the sole is produced.

As illustrated and in accordance with a further feature of the invention, a reinforced rubber turn sole is provided in which the line of demarkation between the rubber body and the fibrous reinforcing layer is obliterated. In the illustrated embodiment of this feature of the invention this advantageous result is obtained by the indentations formed on the feather of the sole. They are disposed radially, that is, substantially transversely of the feather and break up the upper surface of the feather so that the fabric on the feather is not readily noticeable in the completed shoe after the shoe is turned and the feather of the sole exposed. Also, these indentations impart a desirable appearance to the sole simulating the stitched appearance of the sole of a welted leather shoe.

Other objects and features of the invention will appear more fully from the following description considered in connection with the accompanying drawings and the invention will then be defined in the claims.

In the drawings:

Figure 1 is a perspective view of a preferred form of the sole of the present invention;

Fig. 2 is an enlarged cross section of a portion of a shoe illustrating the manner of securing the upper to the sole;

Fig. 3 is a perspective view of the forepart of the sole showing the filler in position thereon;

Fig. 4 is a perspective view partly in section of a completed shoe embodying the present invention.

In the illustrated preferred embodiment of the invention the sole comprises a body 2 of rubber compound molded to the desired shape and then vulcanized. The sole body, as shown, is provided with an inseam stitch receiving rib 4 which is molded on the rubber body 2 and extends from approximately the heel breast line on one side of the sole, about the forepart of the sole, to a corresponding point on the opposite side of the sole. This projecting or sewing rib 4 is located a distance from the edge to provide a feather 6 as in a leather turn sole and it is of such proportions as to constitute the core of a structure adapted to receive a series of single-faced stitches such as are universally used in the manufacture of turn shoes to attach the shoe upper to the sole. In order to insure a strong attachment of the shoe upper to the sole body 2, a strip of fibrous material 8 such, for example, as heavy canvas is applied to the upper surface of the sole. Preferably this fabric strip is wide enough to cover the entire upper surface of the sole and constitutes a reinforcing layer extending from feather to feather of the sole and over the sewing rib 4 but terminating at a distance within the outer edge of the sole where it lies on the feather 6. The fibrous layer is preferably applied to the rubber body at the time the sole is being molded and before vulcanizing so that the rubber compound impregnates the fibrous material 8 and becomes firmly bonded to the sole. It will thus be seen that the stitch receiving structure comprising the portion of canvas inclosing the rib or core 4 on the sole body 2 enables the shoe upper to be strongly attached to the sole and with the same facility as a leather sole. The vulcanized union between the rubber body 2 and the canvas layer 8 where it lies on the feather 6 of the sole is reinforced by embedding the margin of the canvas where it lies on the feather in the rubber in a more or less upset or displaced condition which extends the area of vulcanization. In the illustrated embodiment of the invention a series of alternate ribs and grooves or indentations are formed on the feather to embed the canvas into the rubber body, thus insuring proper adhesion between the two materials and acting to assist the vulcanization by reason of the greater vulcanizing surface produced and the forced impregnation of the rubber into the canvas. These corrugations or indentations on the feather of the sole are preferably disposed substantially radially, that is, transversely of the feather of the sole, thereby imparting to the sole, in addition to their reinforcing function, an ornamental and finished appearance similar to the stitched appearance of the finished welt of a leather shoe. They also serve to obliterate the termination of the canvas 8 on the feather 6 of the sole and render it invisible when the feather is exposed after the shoe is turned. Since the fabric layer 8 is terminated within the outer edge of the rubber body an all-rubber edge face for the sole is provided, and the disadvantage is avoided of having the fabric material included in the edge face of the sole where it would cause difficulty in making a satisfactory edge finish on the sole. Conveniently, these indentations are formed at the time the sole is molded, the mold in which the sole is made being cut away along its edge to provide the indentations in the sole. The shoe upper 10 which may be canvas or other suitable material is provided with the usual toe stiffener 12 to give permanency of shape to the toe portion of the upper.

In the use of the rubber sole just described in the manufacture of a turn shoe the sole 2 is assembled on a last, together with the upper in the usual manner. The shoe upper 10 is first lasted over on to the sole 2, as usual, and then the upper is secured to the sole by blind or single-faced stitches 14 as shown in Fig. 2, the stitches passing through the reinforced stitch receiving element or rib 4. By reason of the reinforced vulcanization of the margin of the canvas 8 on the feather of the sole, the outer wall of the sewing rib 4 is enabled properly to receive the penetrating thrust of the needle during the inseaming operation without liability of loosening the union between the canvas and the rubber body or its giving way. Another important advantage obtained, which appears in sewing the shoe, is that the upper may be drawn more tightly into the angle between the feather and the outer wall of the rib, and incidentally the feather of the sole drawn up against the upper without danger of pulling the canvas away from the rubber body. Moreover, the layer of canvas 8 when extended across the entire sole from feather to feather prevents the sole from spreading and being distorted during wear, and further serves to insulate the foot of the wearer from the objectionable "drawing" caused by bare rubber.

While the shoe is still on the last a filler 16 of any flexible material shaped to occupy the space within the sewing rib about the forepart of the sole is applied to the sole as shown in Fig. 3, the filled-in portion of the sole extending approximately to the ball of the sole and being of substantially the same thickness as the height of the sewing rib 4. The shoe is then removed from the first last and turned. As herein shown, the heel end of the shoe is provided with a nailed heel seat and to this end the upper and lining are not attached to the sole during the inseaming operation. After the shoe has been turned a molded counter 20 is preferably inserted in the shoe between the upper and lining in the usual manner and the heel portion of the upper lasted in onto a heel seat piece 22, the lasted-in portion being secured in position by the lasting tacks 24. Preferably the heel seat piece 22 extends forwardly to fill the space inside the rib 4 throughout the shank portion of the sole and up to the rear edge of the forepart filler piece 16. The heel end of the sole is then beveled as in the usual manner of attaching a wood heel to a leather sole turn shoe and the heel 26 secured to the shoe by the heel nails 28, the upper edge of the heel completely inclosing the sole portion of the shoe, as shown in Fig. 4.

It will be seen that the shoe above described has all of the desirable characteristics of a leather turn shoe and, at the same time, it includes all of the advantages of the rubber sole shoe. By reason of the shank piece 22 extending to the ball line of the shoe sufficient rigidity is obtained to prevent the shoe from breaking down in the shank during wear. The indentations along the feather of the sole give to the rubber sole turn shoe an appearance simulating that of a welted ivory sole shoe as distinguished from the comparatively heavy appearance of the attached sole of the rubber sole shoes heretofore produced.

Having thus described the invention, what is claimed as new and desired to be secured by Letters Patent of the United States is:—

1. As an article of manufacture, a sole for turn shoes consisting of a rubber body portion and a strip of fibrous material a portion of which projects above laterally adjacent portions of the sole to receive inseam stitches and has its outer edge terminating inside the edge of the rubber body and embedded in and secured by vulcanization to said body.

2. As an article of manufacture, a sole for turn shoes consisting of a rubber body portion and a strip of fibrous material secured by vulcanization to the rubber body with a portion projecting above laterally adjacent portions of the sole to receive inseam stitches and having portions of its outer edge on the feather of the sole indented from a substantially flat plane into the rubber to reinforce the attachment of the two materials by vulcanization.

3. As an article of manufacture, a sole for turn shoes consisting of a rubber body portion and a strip of canvas secured by vulcanization to the rubber body with a portion projecting above laterally adjacent portions of the sole to receive the inseam stitches and having its outer margin secured to the rubber body along the feather of the sole by a reinforced vulcanization.

4. As an article of manufacture, a sole for turn shoes consisting of a rubber body portion and a layer of fibrous material secured by vulcanization to the rubber body with a portion projecting above laterally adjacent portions of the sole to receive the inseam stitches and having its outer margin disposed upon the feather of the sole and embedded in the rubber body with a plurality of alternate ribs and grooves extending transversely of the feather.

5. As an article of manufacture, a sole for turn shoes consisting of a rubber body portion having a rib formed on its upper side and a sheet of reinforcing fabric vulcanized to the rubber body portion and extending over the rib and terminated a distance inward from the edge of the rubber body portion with its edge embedded in the body portion to present an all-rubber sole edge when the sole has been incorporated in a shoe.

6. As an article of manufacture, a sole for turn shoes consisting of a rubber body portion having a fabric stitch receiving element molded upon its upper surface with its margin vulcanized upon the feather of the sole, the top surface of the feather of the sole being so broken up as to obliterate any defacement which might otherwise be caused by the portion of the fabric extending on to the feather of the sole.

7. As an article of manufacture, a sole for turn shoes consisting of a rubber body portion having a fibrous stitch receiving element molded upon its upper surface with its margin vulcanized upon the feather of the sole, the outer edge of the fibrous element where it lies on the feather of the sole being obscured from view.

8. As an article of manufacture, a sole for turn shoes consisting of a rubber body portion having a rib formed upon its upper side, and a layer of fibrous material vulcanized to the upper side of the body and extending over said rib on to the feather of the sole to receive stitches, the said feather of the sole being provided with a plurality of transverse indentations which embed the outer margin of the fibrous material into the rubber body of the feather so as to insure firm connection thereof with the rubber.

9. A turn shoe comprising a sole consisting of a rubber body portion provided with a fibrous stitch receiving element a portion of which projects above laterally adjacent portions of the sole to receive inseam stitches and has its outer edge terminating inside the edge of the rubber body with the portion of the fibrous material where it lies on the feather embedded in the rubber body with a series of radially disposed indentations, an upper secured to the sole by single faced stitches passing through the stitch receiving element, and a heel attached to the shoe.

10. A rubber sole turn shoe comprising a sole consisting of a rubber compound body portion having a projecting stitch receiving element adapted to receive a series of single faced stitches and including fibrous material vulcanized to the rubber body and terminating within the edge of the feather of the sole, said fibrous material where it lies upon the feather being impressed into the rubber body to present alternate transverse ribs and grooves rendering the fibrous material not readily distinguishable on the portion of the feather that is visible in the turned and finished shoe, and an upper secured to the sole by single faced stitches passing through the stitch receiving element.

In testimony whereof I have signed my name to this specification.

GEORGE FERGUSON.